Figures 1, 2:
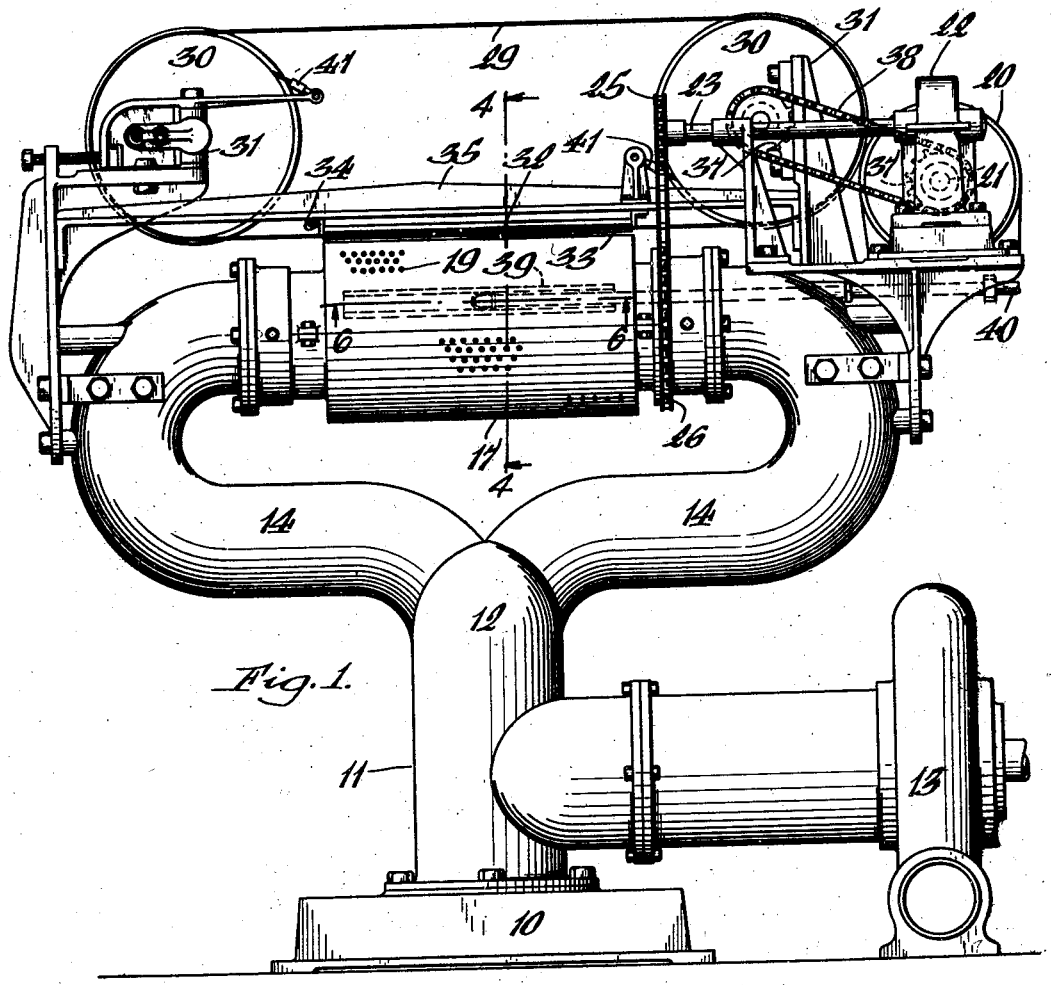

March 12, 1935. O. G. RIESKE 1,993,899

SKINNING MACHINE

Original Filed April 30, 1930 2 Sheets-Sheet 1

Inventor,
Otto G. Rieske,
by Walter P. Guyer
Attorney.

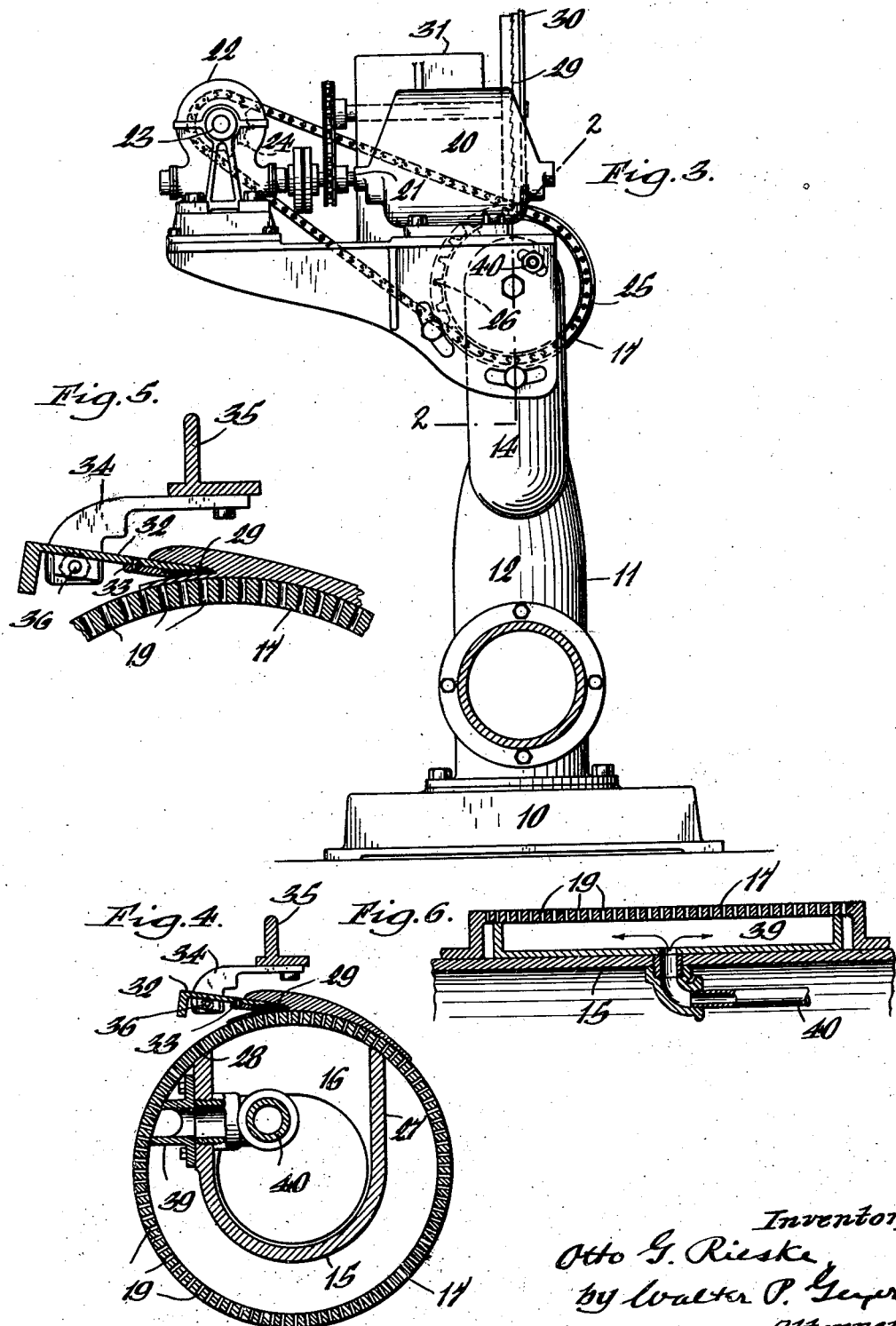

Patented Mar. 12, 1935

1,993,899

UNITED STATES PATENT OFFICE 1,993,899

SKINNING MACHINE

Otto G. Rieske, Buffalo, N. Y.

Application April 30, 1930, Serial No. 448,523
Renewed May 29, 1934

20 Claims. (Cl. 17—2)

This invention relates to a skinning machine and particularly to a machine designed for skinning fish.

One of its objects is the provision of a reliable and efficient machine of this character which will expeditiously and economically effect the skinning of the fish without waste of the meat.

Another object of the invention is to provide simple and positive means for holding the fish in position for presentation to the cutting mechanism.

A further object is to provide a fish skinning machine which is practically automatic in operation, which does not require skilled labor to operate it, and which is not liable to get out of order.

A still further object of the invention is the provision of vacuum means for holding the fish while being cut, and means for effecting the removal of the skin from the holding means after the fish are skinned.

In the accompanying drawings:—

Figure 1 is a side elevation of a skinning machine embodying my invention. Figure 2 is an enlarged fragmentary vertical longitudinal section thereof taken in the plane of line 2—2, Figure 3. Figure 3 is an end view of the machine. Figure 4 is an enlarged cross section taken on line 4—4, Figure 1. Figure 5 is an enlarged fragmentary cross section, similar to Figure 4, showing the manner of skinning the fish. Figure 6 is a fragmentary horizontal section taken in the plane of line 6—6, Figure 1.

Similar characters of reference indicate corresponding parts throughout the several views.

In its general organization, this fish skinning machine comprises a frame for supporting its working parts, the frame being preferably shaped and constructed to constitute an air duct or suction conduit adapted to communicate with a suction fan or similar device; a movable carrier adapted for communication with the air duct and having perforations in its surface which open into the atmosphere and which serve, by the suction effect produced, to hold the fish in place on the carrier while being skinned; a cutter blade disposed over the carrier for severing the skin from the body of the fish; and means for cleaning out the perforated carrier.

Referring now to the drawings, 10 indicates the base of the machine and 11 indicates generally, the frame of the machine which rises from the base and is preferably in the form of an air duct consisting of an upright portion 12 connected to a suction fan 13 and branch portions 14 of substantially U-shape form extending from the upper end of said upright portions, the whole approximating the shape of the letter Y.

The opposing inwardly bent ends of the air duct branches 14 are disposed in horizontal alinement and in spaced relation to receive between them a suction chamber or valve member 15 which forms a continuation of such duct-branches. This valve member is suitably held in a fixed position in the opposing ends of the duct-branches 14 and is provided, preferably in its top side, with a port or opening 16, which extends substantially the full length of the valve member and is of a width substantially equal to that of the diameter of such member. Movable relatively to this valve member is the fish carrier for presenting the fish to the cutting mechanism of the machine, the carrier shown in the drawings being preferred and consisting of a revolving drum 17 journaled at its ends on extensions 18 formed axially on the valve member 15 and provided in its periphery with a plurality of perforations 19, which, as the drum revolves about the valve, are adapted to register with the valve-port 16. This drum may be revolved by any appropriate means, for example, by an electric motor 20 having its shaft 21 connected to a speed reducing mechanism 22, the driven shaft 23 of the latter carrying a sprocket wheel 24 for receiving a sprocket chain 25 which passes at its other end about a sprocket wheel 26 fixed to one end of the drum. The valve opening 16 spans the top portion of the drum as the same is revolved about the axis of the valve member, and as seen in Figures 2 and 4, that portion 27 of the valve containing such opening extends upwardly and bears at its top edges 28 against the inner wall of the drum, such edges 28 being shaped to conform to the curvature of the drum. By this construction, as the drum is revolved, successive portions of its perforated periphery or surface are brought opposite the valve-opening 16 to create a suction at this point sufficient to hold a fish flatwise on the drum-surface.

Disposed over the drum 17 in longitudinal relation thereto is the cutter mechanism for severing the skin from the fish-body as the fish is held by suction on the top portion of the drum-surface. The cutter shown in the drawings is preferable and consists of an endless band or blade 29 whose lower stretch passes directly over the drum and in the plane of the valve-opening 16, the ends of the blade passing around pulleys 30 journaled in suitable bearings applied to brackets 31. By preference, the lower operative stretch of the blade 29 is guided and held firmly between a pair of plates 32, 33, which not only hold the blade in a firm and stiff position for cutting but which also support it in a downwardly inclined position relative to the drum with the cutting edge facing the latter and disposed a sufficient distance above the drum-surface to gage the depth of cut. As shown in Figures 1, 4 and 5, the upper blade holder plate 32 is supported at its ends in brackets 34 secured to a longitudinal rail 35 disposed over the drum, said plate being fulcrumed at 36 to said brackets to enable the blade-holder to be readily adjusted toward and from the drum for gaging the depth of cut desired for skinning the fish. The upper plate 32 of the holder also constitutes a deflector over which the skinned fish travels, the severed skin clinging to the surface of the drum and being carried by it to a point where it is released or removed from the drum by gravity or otherwise.

The blade-pulleys 30 are driven from the motor 20 by sprocket wheels 37 and a sprocket chain 38, the blade being driven at a faster rate of speed than the drum 17.

If desired, means may be provided for removing the skin from the drum and for keeping the perforations 19 thereof open. To this end, I provide an air-blowing device which consists of a manifold 39 secured to the outer face of the valve member 15 at one side of its opening 16 and having its open cutter side directed against the inner wall of the drum 17. Air pressure is delivered to this manifold through a pipe 40 connected to a suitable source of air pressure, not shown, and extending through the valve member and adjoining branch duct 14, in the manner shown in Figures 1 and 6. By this arrangement, as the drum revolves, its perforated surface is presented to the outlet side of the manifold 39 and the air delivered thereto through the pipe 40 forces any skin, scale or other foreign matter from the drum and effectively keeps the perforations clean and open so that when they again reach a position opposite the valve opening 16 the full effect of the suction may be utilized to retain the fish in place on the drum during the skinning operation.

In the skinning operation, the blade picks up certain particles of the fish and these particles are thereafter deposited on the peripheries of the blade-pulleys 30. It is essential that the faces of these pulleys be kept clean of any such foreign matter, and I therefore employ scrapers 41 which yieldingly engage the faces of the pulleys and scrape any foreign matter therefrom.

If desired, water may also be delivered to the manifold 39 to assist in the washing or cleansing of the perforated drum.

For the purpose of increasing the holding capacity of the drum 16 by the suction pressure, I preferably provide its surface with a plurality of grooves 42 which may be in the form of a continuous spiral extending from end to end of the drum and which establish surface communication between the several drum perforations 19. As shown in Figure 2, portions of these grooves intersect the perforations and form a channel way connecting one perforation with another, thereby increasing the area of vacuum when the fish are applied to the drum for skinning.

While I have shown but one embodiment of my invention, it is to be understood that various changes may be made in the construction and arrangement of its parts without departing from the spirit of the invention or sacrificing any of its advantages, and I do not, therefore, wish to be limited to the exact construction herein shown and described.

I claim as my invention:—

1. A machine of the character described, comprising a chambered, perforated carrier for the fish adapted for connection to a source of suction, and a cutter blade disposed over the perforated portion of said carrier for severing the skin from the fish, the skin being held to the carrier by suction during the severing operation and the body of the fish being free to be displaced therefrom after such operation.

2. A machine of the character described, comprising a revolving perforated carrier for the fish, a suction chamber communicating with the perforated portion of the carrier, and a cutter blade disposed over said carrier to sever the skin from the body of the fish.

3. A machine of the character described, comprising a revolving perforated carrier for the fish, a suction chamber in communication with the perforated portion of the carrier, and a cutter blade disposed in a predetermined spaced relation to the carrier and movable at approximately right angles to the path of movement of said carrier to sever the skin from the body of the fish.

4. A machine of the character described, comprising a suction chamber, a carrier movable relatively to the latter and having a perforated fish-receiving surface adapted for communication with said suction chamber, and means for severing the skin from the body of the fish as the same is delivered by the carrier over the suction chamber.

5. A machine of the character described, comprising a suction chamber open at one side, a perforated carrier for the fish movable past the open side of said chamber, and a cutter blade disposed across the path of movement of the carrier and in the plane of the open side of the suction chamber.

6. A machine of the character described, comprising a suction chamber having an opening in its side, a perforated drum revolvable about said chamber and adapted to serve as a support for a fish, and a cutter blade disposed above the drum and over the open side of said chamber for severing the skin from the body of the fish.

7. A machine of the character described, comprising a frame, a suction conduit, a ported valve member in communication with said conduit, a carrier for the fish movable relatively to the valve member and having perforations therein adapted to register with said valve-port, and a cutter blade disposed over said carrier and in the plane of the valve-port for severing the skin from the body of the fish.

8. A machine of the character described, comprising a frame constructed to form a suction conduit, a member interposed in said conduit to form a part thereof and having an opening in its side, a carrier for the fish movable relatively to said member in overlying relation to its opening, said carrier having perforations therein connecting said member with the atmosphere, and a cutter blade disposed over the carrier and in the plane of said member-opening for severing the skin from the body of the fish, the skin being held by suction to the carrier and the body of the fish traveling over the cutter blade.

9. A machine of the character described, comprising a frame, a suction conduit, a ported valve member in connection with said conduit, a revolving fish-carrying drum encircling said valve member and having perforations therein adapted to register with the valve-port, and a cutter blade disposed in predetermined relation over the drum and in the plane of said valve port for severing the skin from the body of the fish.

10. A machine of the character described, comprising a frame constructed to form a suction conduit, a member interposed in said conduit to form a continuation thereof and having an opening therein, a revolving fish-carrying drum encircling said member and having perforations therein adapted to register with said member-opening and a cutter blade movable lengthwise over said drum and disposed substantially centrally opposite the member-opening.

11. A machine of the character described, comprising a suction chamber having an opening in its side, a perforated carrier for the fish movable past the open side of said chamber, a cutter blade disposed across the path of movement of the carrier and in the plane of the open side of the suction chamber for severing the skin from the body of the fish, the skin being held by suction to the carrier and the body of the fish traveling over the cutter blade, and means for automatically removing the skin from the carrier.

12. A machine of the character described, comprising a suction chamber having an opening in its side, a perforated carrier for the fish movable past the open side of said chamber, a cutter blade disposed across the path of movement of the carrier and in the plane of the open side of the suction chamber for severing the skin from the body of the fish, the skin being held by suction to the carrier and the body of the fish traveling over the cutter blade, and means for delivering air pressure to the perforated carrier to effect the removal of the severed skin from its surface, said means being disposed beyond the delivery side of the cutter blade.

13. A machine of the character described, comprising a suction chamber having an opening in its side, a perforated drum revolvable about said chamber, and adapted to serve as a support for a fish, a cutter blade disposed above the drum and over the open side of said chamber for severing the skin from the body of the fish, and a manifold for receiving air under pressure arranged within said drum and isolated from said suction chamber, the outlet of said manifold facing the inner surface of said perforated drum.

14. In a fish skinning machine, a perforated revolving drum constituting a carrier for the fish, a suction chamber in communication with said drum, and a spiral groove formed on said drum-surface and intersecting some of said perforations.

15. A fish skinning machine, comprising a chambered support for the fish adapted for communication with a source of suction and having perforations therein, and a cutter blade disposed over said support to sever the skin from the body of the fish, the skin being held by suction to the support and the body of the fish traveling over the cutter blade.

16. A machine of the character described, comprising a support upon which the fish is adapted to be laid, means associated with the support and acting on the entire under-surface area of the fish for holding it in bodily adhering relation to said support, and a cutter disposed over the support in contiguous relation thereto for entering the fish between its meat portion and that portion of the skin overlying the support.

17. A machine of the character described, comprising a support upon which the fish is adapted to be laid, a cutter disposed over the support for entering the fish between its meat portion and that portion of the skin overlying said support, and means for drawing and holding the entire surface of such overlying portion of the skin in tenaciously adhering relation to the support.

18. A machine of the character described, comprising a movable carrier upon which the fish is adapted to be supported, means associated with the carrier and acting on the under-skin surface of the fish for tenaciously holding the fish bodily thereto, and means for severing the tenaciously held, under-skin surface from the fish-body.

19. A machine of the character described, comprising a carrier for the fish, means for holding the fish to the carrier in tenaciously adhering relation thereto while being skinned, a cutter blade movable over the carrier for severing the adhered portion of the skin from the body of the fish, a guide between which the blade travels as it passes over the carrier, said guide including top and bottom plates shrouding all but the cutting edge of the blade, and means for adjusting said guide toward and from the carrier to vary the angular disposition of the blade for gaging its depth of cut.

20. A skinning machine, comprising a support for the object being skinned, a knife for severing the skin from the object, said support and knife being mounted for relative movement, and means for holding the skin side of the object over its entire area in tenaciously adhering relation to said support while being skinned.

OTTO G. RIESKE.